(12) United States Patent
Chen

(10) Patent No.: US 6,603,613 B2
(45) Date of Patent: Aug. 5, 2003

(54) REFLECTION LENS SUPPORT STRUCTURE

(75) Inventor: Tsung-Yin Chen, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/940,394

(22) Filed: Aug. 27, 2001

(65) Prior Publication Data

US 2003/0039038 A1 Feb. 27, 2003

(30) Foreign Application Priority Data

Jul. 23, 2001  (TW) .......................................... 90212420

(51) Int. Cl.[7] .......................... G02B 7/02; G03B 17/26; G03B 21/14; F21V 17/00
(52) U.S. Cl. ..................... 359/819; 359/818; 396/526; 362/455; 353/100
(58) Field of Search ................................. 359/819, 871, 359/805, 811, 820, 827, 818; 396/526; 362/455; 353/100

(56) References Cited

U.S. PATENT DOCUMENTS 4,319,836 A * 3/1982 Murata et al. ................. 355/55

* cited by examiner

Primary Examiner—Georgia Epps
Assistant Examiner—Joseph Martinez
(74) Attorney, Agent, or Firm—J. C. Patents

(57) ABSTRACT

A reflection mirror support structure, applied to support a reflection mirror of an optical scanner. Using three points or a single point and a line to construct a plane, projecting rib and projecting point are formed on a carrier to hold the reflection mirror. The image distortion caused by bending the reflection mirror and twist deformation because of structures not being parallel to each other is improved.

7 Claims, 4 Drawing Sheets

REFLECTION LENS SUPPORT STRUCTURE

BACKGROUND OF THE INVENTION

1. Field of the Invention

The invention relates in general to a reflection mirror support structure, and more particularly, to a reflection mirror support structure used in an optical scanner.

2. Description of the Related Art

The conventional optical scanner as illustrated in FIG. 1 has a light source 100, a reflection mirror set 400, a lens 500, an enclosure 900 and an optical sensor such as a charge couple device (CCD) 600. While performing scanning, light from the light source 100 is incident onto a document 200 to obtain an image light by reflection or transmission. The reflection mirror set 400 comprises several reflection mirrors 401, 402, 403 and is located in an optical path of the image light. The image of document 200 on the light transmissible plate 300 is directed to the reflection mirror set 400 and reflected to the lens 500 by the reflection mirror set 400. The lens 500 can receive the image light of the document 200 transmitted by the reflection mirror set 400 and display the image light on the charge couple device 600.

The conventional method of mounting the reflection mirror is shown in FIG. 2. The enclosure 900 inside the optical scanner contains therein a pair of vertical planes and a pair of parallel supporting seats 700 is formed thereon. Each supporting surface 705 for holding the carrier seats 700 has a projecting rib 701, while the bottom surface of both ends of the reflection mirror 401 are in line contact with the projecting ribs 701 on the supporting surfaces 705 and are held thereby. After adjusting the position of the reflection mirror 401, a tool such as a pair of tongs is used to attach the two ends of the reflection mirror 401 to the two carrier seats.

When the carrier seats 700 and the enclosure 900 of the optical scanner are integrated by injection molding, the supporting seats 700 are easily formed unparallel to each other due to poor conditions of injection molding. Under such circumstances, the reflection mirror 401 attached to the supporting seats 700 is easily twisted and deformed to manifest an unstable angle. Further, angle variation easily occurs during shifting or transportation to cause the image dislocation, which affects the image quality.

SUMMARY OF THE INVENTION

The invention provides a reflection mirror support structure applied to the reflection mirror of an optical scanner. Using three points or a single point and a line to construct a plane, the reflection mirror is held. The image distortion caused by bending the reflection mirror or twisted deformation because of an unparallel surface angle is improved.

The reflection mirror holding structure located in a scan module bulk enclosure inside of an optical scanner holds at least one reflection mirror. The reflection mirror support structure comprises a first supporting seat, a second supporting seat and at least a fastener. The first supporting seat is formed on the scan module bulk enclosure. The first supporting seat has a supporting surface, on which a projecting rib is formed. The second supporting seat is formed on the scan module bulk surface. The second supporting seat has a supporting surface on which a projecting rib is formed. The supporting surfaces of the first and second supporting seats are level with each other. The heights of projecting ribs on the first and the second supporting surfaces are the same, while the projecting ribs of the first and the second supporting surfaces extend perpendicular to each other. The fastener is used to fasten and attach two ends of the reflection mirror to the first and second supporting seats, respectively. The bottom surfaces of the two ends of the reflection mirror are respectively in contact with the projecting ribs of the first and the second supporting seats, while these two projecting ribs are in point and line contact.

The invention further provides another reflection mirror support structure located in a scan module bulk enclosure of an optical scanner to hold at least one reflection mirror. The reflection mirror support structure comprises a first supporting seat, a second supporting seat, and at least one fastening member. The first supporting seat formed on the scan module bulk enclosure has a supporting surface, on which a projecting point is formed. The second supporting. seat formed on the scan module bulk enclosure has a supporting surface, on which two projecting points are formed. The supporting surface of the second supporting seat is on a same plane of the supporting surface of the first supporting seat, and the projecting point of the first supporting seat is not on the line drawn between the projecting points on the second supporting seat. The fastening member is used to attach two ends of the reflection mirror to the first and the second supporting seats. When the reflection mirror is attached to the first and the second supporting seats, the bottom surfaces of the two ends of the reflection mirror are respectively in contact with the projecting points on the second supporting seat and the first supporting seat. The contacts for the projecting points of the second and first supporting seat are in a form of point contact.

Accordingly, perpendicularly projecting ribs are formed on two supporting seats, and the theory for forming a plane with a point and a line is applied to attach the reflection mirror to the two supporting seats. Thus constructed, the supporting seats are parallel to each, and twisting deformation is eliminated.

Further, a projecting rib and two projecting points are formed on two supporting seats, respectively. The theory of forming a plane with three points is applied to attache the reflection mirror to the two supporting seats. Thus, the supporting seats are parallel to each, and the twisting deformation is eliminated.

Further, a projecting point and two projecting points are formed on two supporting seats, respectively. The theory of forming a plane with three points is applied to attach the reflection mirror to the two supporting seats. Thus, the supporting seats are parallel to each, and the twisting deformation is eliminated.

Both the foregoing general description and the following detailed description are exemplary and explanatory only and are not restrictive of the invention, as claimed.

DESCRIPTION OF THE PREFERRED EMBODIMENTS

First Embodiment

Figure 1:
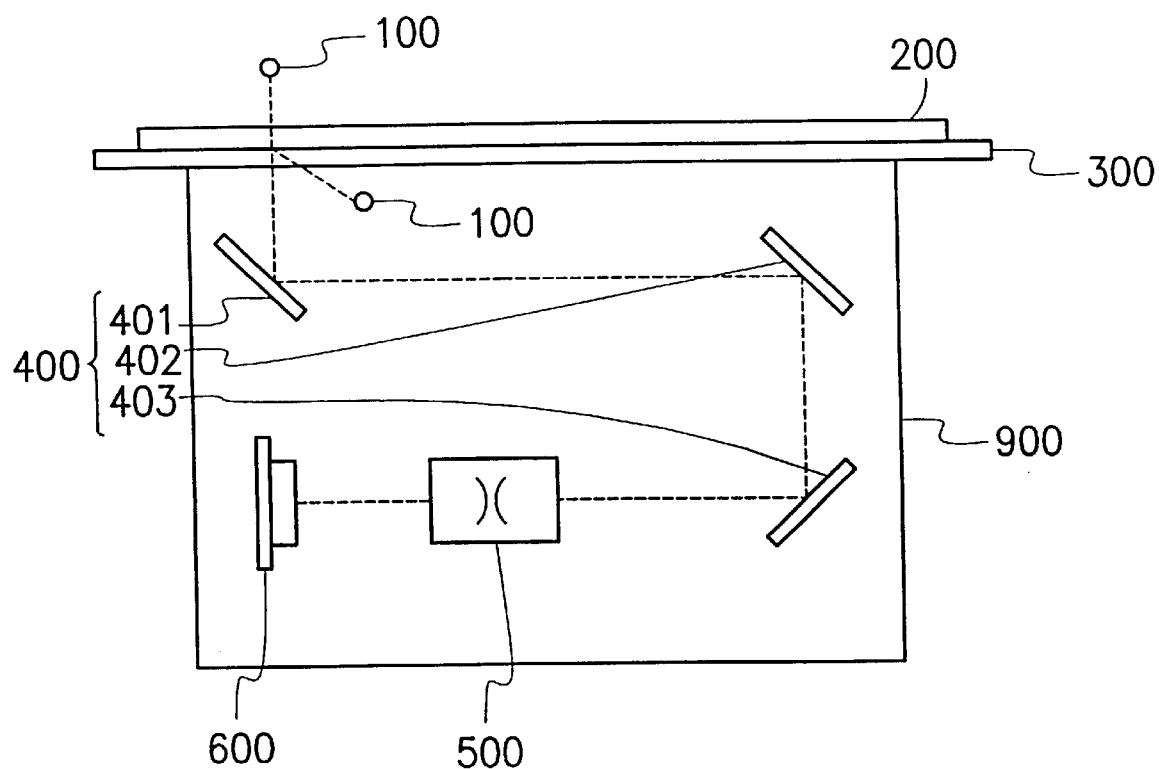
FIG. 1 shows a schematic, cross-sectional view of a conventional optical scanner.
Figure 2:
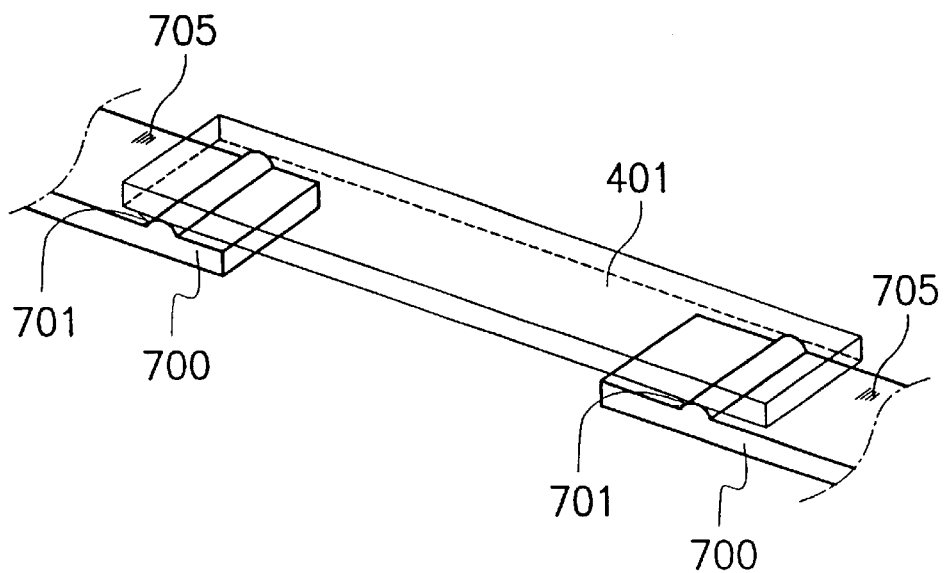
FIG. 2 shows a reflection mirror support structure used in the conventional optical scanner.
Figure 3:
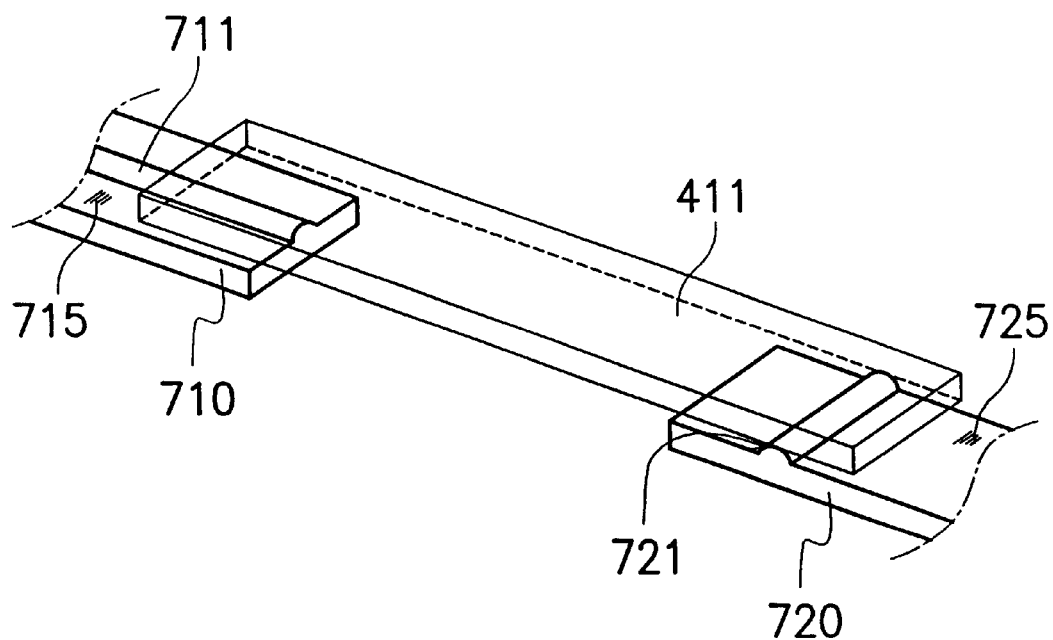
FIG. 3 shows a first embodiment of a reflection mirror support structure of an optical scanner according to the invention.

FIG. 3 shows a first embodiment of a reflection mirror support structure according to the invention. On two parallel vertical planes of the enclosure inside of the optical scanner, parallel supporting seats 710 and 720 are formed respectively in the same level. The supporting seats 710 and 720 hold the reflection mirror 411 on supporting surfaces 715 and 725 thereof, respectively. Projecting ribs 711 and 721 perpendicular to each other are formed on the reflection surfaces 715 and 725. Two ends of the reflection mirror 411 are in point and line contact with the projecting ribs 711 and 720, such that the reflection mirror 411 is held and supported thereby. After adjusting the position of the reflection mirror 411, a fastening member such as clip is used to attach the two ends of the reflection mirror 411 to the supporting seats 710 and 720.

The projecting ribs 711 and 721 on the supporting seats 710 and 720 form a plane based on the theory of forming a plane with one point and one line. Consequently, when attaching the reflection mirror 411 to the supporting seats, the image distortion that affects the scan resolution due to twisted deformation by unparallel supporting seats is eliminated.

Second Embodiment

Figure 4:
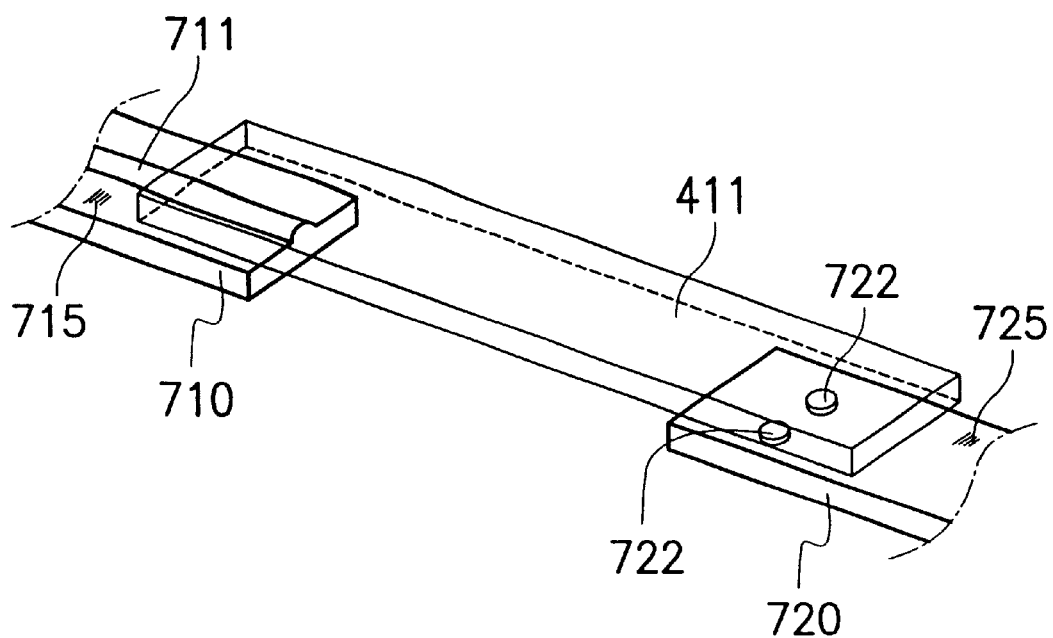
FIG. 4 shows a second embodiment of a reflection mirror support structure of an optical scanner according to the invention.

FIG. 4 shows a second embodiment of a reflection mirror support structure according to the invention. On two parallel vertical planes of the enclosure inside of the optical scanner, parallel supporting seats 710 and 720 are formed respectively in the same level. The supporting seats 710 and 720 hold the reflection mirror 411 on supporting surfaces 715 and 725 thereof, respectively. One projecting rib 711 and two projecting points 722 are formed on the reflection surfaces 715 and 725. The line drawn by the two projecting points 722 is perpendicular to the projecting rib 711. Two ends of the reflection mirror 411 are in line contact with the projecting ribs 711 and the projecting points 722, such that the reflection mirror 411 is held and supported by the supporting seats 710 and 720. After adjusting the position of the reflection mirror 411, a fastening member such as clip is used to attach the two ends of the reflection mirror 411 to the supporting seats 710 and 720.

The projecting ribs 711 and projecting points 722 on the supporting seats 710 and 720 form a plane based on the theory of forming a plane with one points. Consequently, when attaching the reflection mirror 411 to the supporting seats, the image distortion that affects the scan resolution due to twisted deformation by unparallel supporting seats is eliminated.

Third Embodiment

Figure 5:
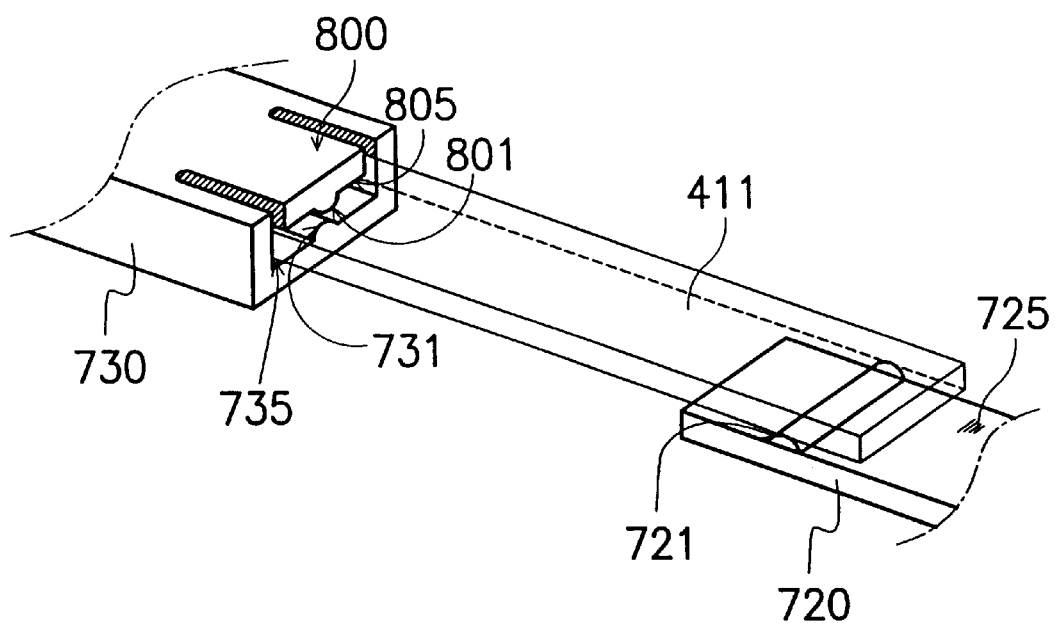
FIG. 5 shows a third embodiment of a reflection mirror support structure of an optical scanner according to the invention.

FIG. 5 shows a third embodiment of a reflection mirror support structure according to the invention. On two parallel vertical planes of the enclosure inside of the optical scanner, parallel supporting seats 730 and 720 are formed respectively in the same level. The supporting seats 730 and 720 hold the reflection mirror 411 on supporting surfaces 735 and 725 thereof. Two perpendicular projecting ribs 731 and 721 are formed on the supporting surfaces 735 and 725, respectively. Further, an elastic suspension wall 800 with clamping surface 805 parallel to and opposing the supporting surface 735 is integrated into the supporting seat 730. The elastic suspension surface 805 has a projecting rib 801 thereon. The distance between the projecting rib 801 on the elastic suspension wall 800 and the projecting rib 731 is smaller than the thickness of the reflection mirror 411. One end of the reflection mirror 411 is located between the supporting surface 735 of the supporting seat 730 and the clamping surface 805 of the elastic suspension wall and is in point contact with the projecting ribs 731 and 801 of the supporting seat 730 and the suspension wall 800. With the elastic of elastic suspension wall 800, the reflection mirror 411 is attached thereby. The other end of the reflection mirror 411 is in line contact with the projecting rib 721 of the supporting seat 720. Using a clamping tool, the reflection mirror 411 is then attached to the supporting seat 720.

The projecting ribs 731 and 721 on the supporting seats 730 and 720 form a plane based on the theory of forming a plane with one point and one line. Consequently, while attaching the reflection mirror 411 to the supporting seats, the image distortion that affects the scan resolution due to twisted deformation by unparallel supporting seats is eliminated.

Fourth Embodiment

Figure 6:
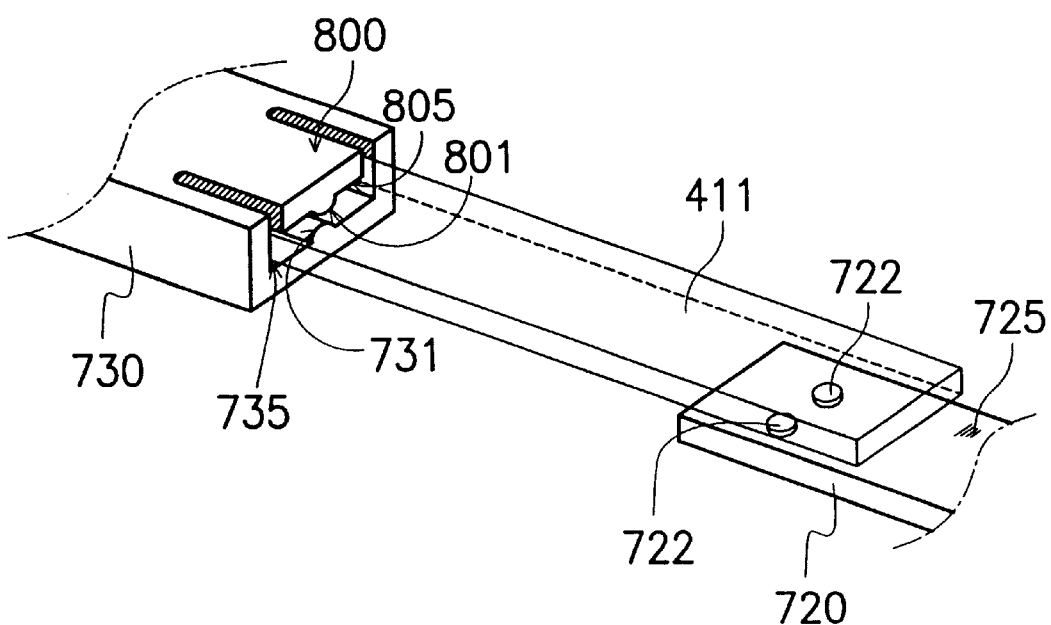
FIG. 6 shows a fourth embodiment of a reflection mirror support structure of an optical scanner according to the invention.

FIG. 6 shows a fourth embodiment of a reflection mirror support structure according to the invention. On two parallel vertical planes of the enclosure inside of the optical scanner, parallel supporting seats 730 and 720 are formed respectively in the same level. The supporting seats 730 and 720 hold the reflection mirror 411 on supporting surfaces 735 and 725 thereof. A projecting rib 731 and two projecting points 722 are formed on the supporting surfaces 735 and 725, respectively. The line drawn by the projecting points 722 is perpendicular to the projecting rib 731. Further, an elastic suspension wall 800 with clamping surface 805 parallel to and opposing the supporting surface 735 is integrated on the supporting seat 730. The elastic suspension surface 805 has a projecting rib 801 thereon. The distance between the projecting rib 801 on the elastic suspension wall 800 and the projecting rib 731 is smaller than the thickness of the reflection mirror 411. One end of the reflection mirror 411 is located between the supporting surface 735 of the supporting seat 730 and the clamping surface 805 of the elastic suspension wall 800 and is in point contact with the projecting ribs 731 and 801 of the supporting seat 730 and the suspension wall 800. With the elastic of elastic suspension wall 800, the reflection mirror 411 is attached thereby. The other end of the reflection mirror 411 is in point contact with the projecting points 722 of the supporting seat 720. Using a clamping tool, the reflection mirror 411 is then attached to the supporting seat 720.

The projecting ribs 731 and the projecting points 722 on the supporting seats 730 and 720 form a plane based on the theory of forming a plane with three points. Consequently, when attaching the reflection mirror 411 to the supporting seats, the image distortion that affects the scan resolution due to twisted deformation by unparallel supporting seats is eliminated.

Fifth Embodiment

Figure 7:
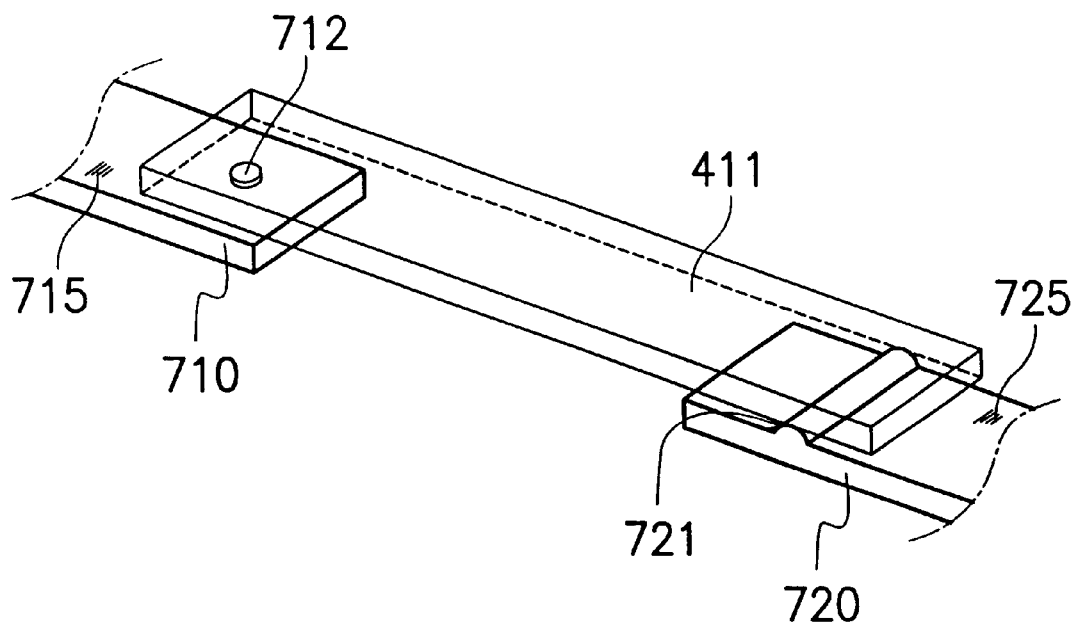
FIG. 7 shows a fifth embodiment of a reflection mirror support structure of an optical scanner according to the invention.

FIG. 7 shows a fifth embodiment of a reflection mirror support structure according to the invention. On two parallel vertical planes of the enclosure inside of the optical scanner, parallel supporting seats 710 and 720 are formed respectively in the same level. The supporting seats 710 and 720 hold the reflection mirror 411 on supporting surfaces 715 and 725 thereof. Projecting point 712 and the projecting rib 721 are formed on the supporting surfaces 715 and 725, respectively. The projecting point 712 is not along the extending direction of the projecting rib 721. Two ends of the reflection mirror 411 are in point and line contact with the projecting point 712 and the projecting rib 720, respectively, such that the reflection mirror 411 is held and supported thereby. After adjusting the position of the reflection mirror 411, a fastening member such as clip is used to fix the two ends of the reflection mirror 411 to the supporting seats 710 and 720.

The projecting ribs 711 and 721 on the supporting seats 710 and 720 form a plane based on the theory of forming a plane with one point and one line. Consequently, when attaching the reflection mirror 411 to the supporting seats, the image distortion that affects the scan resolution due to twisted deformation by unparallel supporting seats is eliminated.

Further, a elastic suspension wall 800 of the supporting seat 730 in the third embodiment can be integrated into the supporting seat 710 to replace the fastening member to clamp the reflection mirror 411.

Sixth Embodiment

Figure 8:
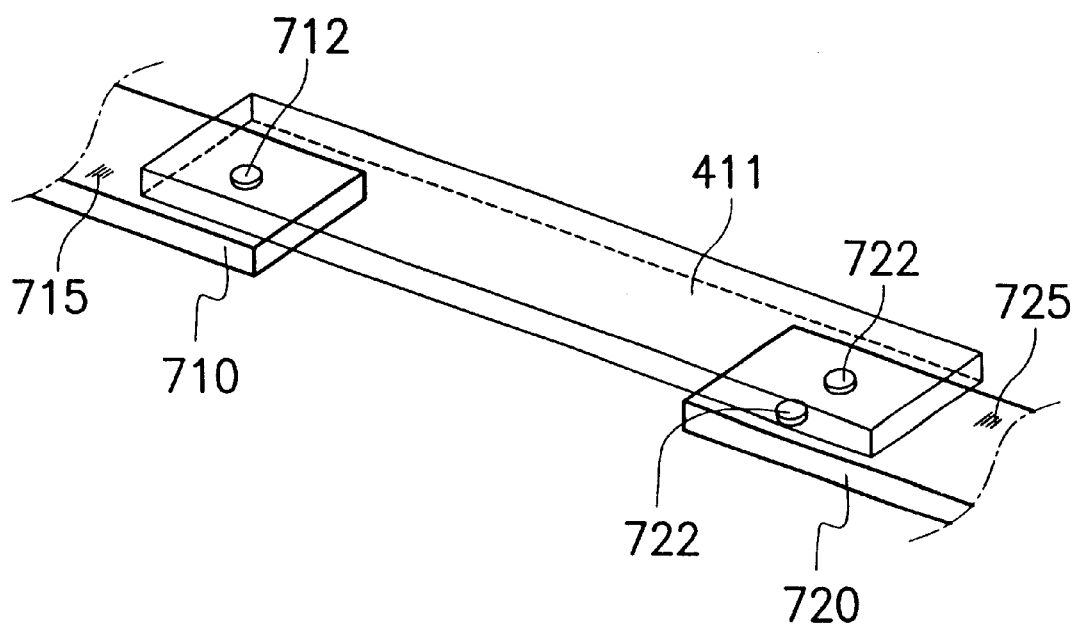
FIG. 8 shows a sixth embodiment of a reflection mirror support structure of an optical scanner according to the invention.

FIG. 8 shows a sixth embodiment of a reflection mirror support structure according to the invention. On two parallel vertical planes of the enclosure inside of the optical scanner, parallel supporting seats 710 and 720 are formed respectively in the same level. The supporting seats 710 and 720 hold the reflection mirror 411 on supporting surfaces 715 and 725 thereof. Projecting points 712 and 722 are formed on the supporting surfaces 715 and 725, respectively. The projecting point 712 is not along the line drawn by the projecting points 722. Two ends of the reflection mirror 411 are in point contact with the projecting points 712 and 722, respectively, such that the reflection mirror 411 is held and supported by the supporting seats 710 and 720. After adjusting the position of the reflection mirror 411, a fastening member such as clip is used to attach the two ends of the reflection mirror 411 to the supporting seats 710 and 720.

The projecting points 712 and 722 on the supporting seats 710 and 720 form a plane based on the theory of forming a plane with one point and one line. Consequently, when attaching the reflection mirror 411 to the supporting seats, the image distortion that affects the scan resolution due to twisted deformation by unparallel supporting seats is eliminated.

Further, a elastic suspension wall 800 of the supporting seat 730 in the third embodiment can be integrated into the supporting seat 710 to replace the fastening member to clamp the reflection mirror 411.

According to the above, the invention has at least the following advantages:

(1) Two perpendicular projecting ribs are respectively formed on two supporting seats to apply the theory for forming one plane with one point and one line. Thereby, when the reflection mirror is attached to two supporting seats, the image distortion caused by twisted deformation because of unparallel supporting surfaces is eliminated.

(2) One projecting rib and two projecting points are respectively formed on two supporting seats to apply the theory for forming one plane with three points. Thereby, when the reflection mirror is attached to two supporting seats, the image distortion caused by twisted deformation because of unparallel supporting surfaces is eliminated.

(3) one and two projecting points are respectively formed on two supporting seats to apply the theory for forming one plane with three points. Thereby, when the reflection mirror is attached to two supporting seats, the image distortion caused by twisted deformation because of unparallel supporting surfaces is eliminated.

(4) By integrating an elastic suspension wall on the supporting seat to clamp the reflection mirror, the number of the fastening members is reduced, and the cost is thus reduced.

Other embodiments of the invention will appear to those skilled in the art from consideration of the specification and practice of the invention disclosed herein.. It is intended that the specification and examples to be considered as exemplary only, with a true scope and spirit of the invention being indicated by the following claims.

What is claimed is:

1. A reflection mirror structure, disposed in a scan module bulk enclosure of an optical scanner to hold at least one reflection mirror, the reflection mirror comprising:

a first supporting seat plate, formed on the scan module bulk enclosure and having a first supporting surface, on which a projecting rib is formed;

second supporting seat plate, formed on the scan module bulk enclosure and having a second supporting surface, on which a projecting rib is formed, wherein the second supporting surface of the second supporting seat plate is level with the first supporting surface of the first supporting seat plate, the projecting rib on the first supporting surface is identical in height to the projecting rib on the second supporting surface, and these two projecting ribs are perpendicular to each other; and at least a clamping member to attach two ends of the reflection mirror to the first and the second supporting seat plates;

wherein when the reflection mirror is attached to the first and the second supporting seat plates, bottom surfaces of the two ends of the reflection mirror are in line and line contact with the projecting ribs of the first and second supporting seat plates, respectively.

2. The reflection mirror support structure according to claim 1, wherein the clamping member comprises:

an elastic suspension wall formed on the first supporting seat plate, the elastic suspension wall having a clamping surface parallel to and opposing the supporting surface of the first supporting seat plate, and the clamping surface having a projecting rib thereon, wherein a distance between the projecting ribs of the elastic suspension wall and the first supporting seat plate is smaller than a thickness of the reflection mirror; and while clamping, one end of the reflection mirror is located between the projecting ribs of the elastic suspension wall and the supporting surface of the first supporting seat plate to use the elastics thereof for attaching, and the projecting rib of the first supporting seat plate is in point contact with the projecting rib of the elastic suspension wall.

3. The reflection mirror support structure according to claim 1, wherein the clamping member comprises:

an elastic suspension wall formed on the second supporting seat plate, the elastic suspension wall having a clamping surface parallel to and opposing the second supporting surface of the second supporting seat plate, and a projecting rib on the clamping surface, wherein a distance between the projecting ribs of the elastic suspension wall and the second supporting seat plate is smaller than a thickness of the reflection mirror; and while clamping, one end of the reflection mirror is located between the projecting ribs of the elastic suspension wall and the second supporting surface of the second supporting seat plate to use the elastics thereof for attaching, and the projecting rib of the second supporting seat plate is in point contact with the projecting rib of the elastic suspension wall.

4. A reflection mirror structure, disposed in a scan module bulk enclosure of an optical scanner to hold at least one reflection mirror, the reflection mirror comprising:

a first supporting seat plate, formed on the scan module bulk enclosure and having a first supporting surface, on which a projecting rib is formed;

a second supporting seat plate, formed on the scan module bulk enclosure and having a first supporting surface, on which two projecting points are formed, wherein the second supporting surface of the second supporting seat plate is level with the first supporting surface of the first supporting seat plate, the projecting rib on the first supporting surface is identical in height with the projecting points on the second supporting surface, and the projecting rib is perpendicular to a line drawn by the projecting points; and at least a clamping member to attach two ends of the reflection mirror to the first and the second supporting seat plates;

wherein when the reflection mirror is attached to the first and the second supporting seat plates, bottom surfaces of the two ends of the reflection mirror are in line and point contact with the projecting rib and projecting points of the first and second supporting seat plates, respectively.

5. The reflection mirror support structure according to claim 4, wherein the clamping member comprises:

an elastic suspension wall formed on the first supporting seat plate, the elastic suspension wall having a clamping surface parallel to and opposing the first supporting surface of the first supporting seat plate, and the clamping surface having a projecting rib thereon, wherein a distance between the projecting ribs of the elastic suspension wall and the first supporting seat plate is smaller than a thickness of the reflection mirror; and while clamping, one end of the reflection mirror is located between the projecting ribs of the elastic suspension wall and the supporting surface of the first supporting seat plate to use the elastics thereof for attaching, and the projecting rib of the first supporting seat plate is in point contact with the projecting rib of the elastic suspension wall.

6. The reflection mirror support structure according to claim 4, wherein the clamping member comprises:

an elastic suspension wall formed on the second supporting seat plate, the elastic suspension wall having a clamping surface parallel to and opposing the supporting surface of the second supporting seat plate, and a projecting rib on the clamping surface, wherein a distance between the projecting rib of the elastic suspension wall and the projecting points of the second supporting seat plate is smaller than a thickness of the reflection mirror; and while clamping, one end of the reflection mirror is located between the projecting rib of the elastic suspension wall and the projecting points of the second supporting surface of the second supporting seat plate to use the elastics thereof for attaching, and the projecting points of the second supporting seat plate are in point contact with the projecting rib of the elastic suspension wall.

7. A reflection mirror structure, disposed in a scan module bulk enclosure of an optical scanner to hold at least one reflection mirror, the reflection mirror comprising:

a first supporting seat plate, formed on the scan module bulk enclosure and having a first supporting surface, on which a projecting point is formed;

a second supporting seat plate, formed on the scan module bulk enclosure and having a second supporting surface, on which a projecting rib is formed, wherein the second supporting surface of the second supporting seat plate is level with the first supporting surface of the first supporting seat plate, the projecting point on the first supporting surface is identical in height to the projecting rib on the second supporting surface; and at least a clamping member to attach two ends of the reflection mirror to the first and the second supporting seat plates;

wherein when the reflection mirror is attached to the first and the second supporting seat plates, bottom surfaces of the two ends of the reflection mirror are in point and line contact with the projecting point and the projecting rib of the first and second supporting seat plates, respectively.

* * * * *